(No Model.)
J. A. BURTON.
BICYCLE TIRE.
No. 578,134. Patented Mar. 2, 1897.
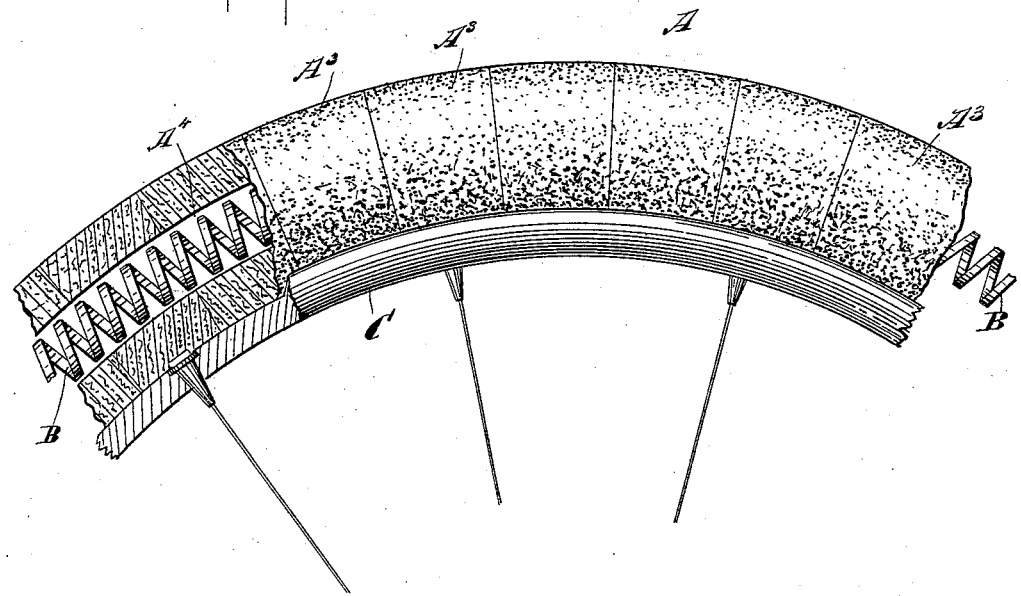
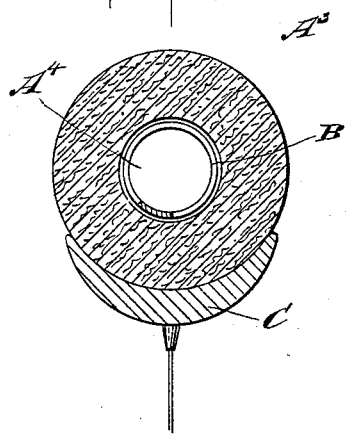
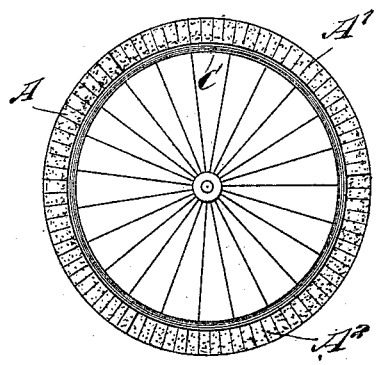
WITNESSES:
INVENTOR
J. A. Burton.
BY
ATTORNEYS.

UNITED STATES PATENT OFFICE.

JOHN A. BURTON, OF SKANEATELES, NEW YORK.

BICYCLE-TIRE.

SPECIFICATION forming part of Letters Patent No. 578,134, dated March 2, 1897.

Application filed September 26, 1896. Serial No. 607,011. (No model.)

*To all whom it may concern:*

Be it known that I, JOHN A. BURTON, of Skaneateles, in the county of Onondaga and State of New York, have invented a new and Improved Bicycle-Tire, of which the following is a full, clear, and exact description.

The object of the invention is to provide a new and improved bicycle-tire which is simple, light, and durable in construction, easily and cheaply manufactured, and not liable to collapse upon being punctured.

The invention consists of certain parts and details and combinations of the same, as will be fully described hereinafter and then pointed out in the claim.

Reference is to be had to the accompanying drawings, forming a part of this specification, in which similar characters of reference indicate corresponding parts in all the figures.

Figure 1 is a side elevation of the improvement as applied and with part in section. Fig. 2 is a cross-section of the same, and Fig. 3 is a reduced side elevation of the improvement.

The improved bicycle-tire is made in sections $A$ $A'$ $A^2$, each formed of a series of apertured segmental pieces $A^3$, of cork or like material, cylindrical in cross-section, with the ends of the pieces fastened together by cement or other adhesive substance. Each of the pieces $A^3$ is formed with a central opening $A^4$, so that the registering openings form a continuous passage for a spring B, made of flat metal and coiled up, as indicated in Fig. 1. By having the tire made in sections $A$ $A'$ $A^2$, as described, I am enabled to put the tire conveniently in place on the rim C of the bicycle-wheel, it being understood that the spring B holds the several sections together, and at the same time permits of drawing the sections apart to pull the tire in place over the face of the rim C.

Now it will be seen that by the arrangement described the several sections are securely held in position on the rim C, and as each section is made of pieces of a very light and elastic material sufficient elasticity is given to the bicycle-tire, and at the same time puncturing of the same is not liable to collapse the tire or seriously affect the efficiency of the same.

Having thus fully described my invention, I claim as new and desire to secure by Letters Patent—

As a new article of manufacture, the removable bicycle-tire herein described, consisting of three separable segmental sections forming when placed together the complete tire, each of said sections being formed of cylindrical pieces of cork each having a central opening and being cemented together with such openings in alinement, whereby a central passage is formed through the said sections, and an endless coil-spring inserted in the continuous passage formed by the three sections placed together, whereby the said sections are removably held on the rim of the wheel, as and for the purpose set forth.

JOHN A. BURTON.

Witnesses:
C. W. ALLIS,
G. C. DURSTON.